United States Patent
Shim et al.

(10) Patent No.: US 11,599,225 B2
(45) Date of Patent: Mar. 7, 2023

(54) DISPLAY APPARATUS AND CONTROL METHOD THEREOF

(71) Applicants: Samsung Electronics Co., Ltd., Suwon-si (KR); INDUSTRY-UNIVERSITY COOPERATION FOUNDATION HANYANG UNIVERSITY, Seoul (KR)

(72) Inventors: Huijun Shim, Suwon-si (KR); Kwankyu Park, Seoul (KR); Gwanhyung Kim, Suwon-si (KR)

(73) Assignees: SAMSUNG ELECTRONICS CO., LTD., Suwon-si (KR); INDUSTRY-UNIVERSITY COOPERATION FOUNDATION HANYANG UNIVERSITY, Seoul (KR)

(*) Notice: Subject to any disclaimer, the term of this patent is extended or adjusted under 35 U.S.C. 154(b) by 0 days.

(21) Appl. No.: 17/282,868

(22) PCT Filed: Oct. 18, 2019

(86) PCT No.: PCT/KR2019/013714
§ 371 (c)(1),
(2) Date: Apr. 5, 2021

(87) PCT Pub. No.: WO2020/080870
PCT Pub. Date: Apr. 23, 2020

(65) Prior Publication Data
US 2021/0349570 A1 Nov. 11, 2021

(30) Foreign Application Priority Data
Oct. 19, 2018 (KR) .................. 10-2018-0125237

(51) Int. Cl.
*G06F 3/041* (2006.01)
*G06F 3/043* (2006.01)

(52) U.S. Cl.
CPC .......... *G06F 3/0436* (2013.01); *G06F 3/0416* (2013.01)

(58) Field of Classification Search
CPC .... G06F 3/03545; G06F 3/041; G06F 3/0412; G06F 3/0416; G06F 3/04164; G06F 3/0418; G06F 3/043; G06F 3/0436
See application file for complete search history.

(56) References Cited

U.S. PATENT DOCUMENTS 6,005,327 A 12/1999 Toda
7,724,355 B1 * 5/2010 McIntosh ................ G06F 3/043
356/28

(Continued)

FOREIGN PATENT DOCUMENTS

KR 10-2002-0064344 A 8/2002
KR 10-2002-0090213 A 11/2002

(Continued)

OTHER PUBLICATIONS

Kamyar Firouzi et al., "Numerical Modeling of Ultrasonic Touchscreen", *2014 IEEE International Ultrasonics Symposium (IUS)*.

(Continued)

*Primary Examiner* — Ryan A Lubit
(74) *Attorney, Agent, or Firm* — Staas & Halsey LLP (57) ABSTRACT

The display apparatus includes a display including a touch screen; a plurality of transducers provided to be spaced apart from each other at edges of the touch screen, and configured to transmit and receive an ultrasonic signal with respect to the touch screen; and a processor configured to identify a touch position on the touch screen based on the ultrasonic signal transmitted and received by the plurality of transduc- (Continued)

ers, wherein the transducer includes a plurality of electrodes arranged from an edge side of the touch screen toward an inner side of the touch screen, and a first electrode at the edge side among the plurality of electrodes is shorter than a second electrode at the inner side.

15 Claims, 9 Drawing Sheets

(56) References Cited

U.S. PATENT DOCUMENTS

| | | | | |
|---|---|---|---|---|
| 2004/0090432 | A1* | 5/2004 | Takahashi | G06F 3/0436 345/173 |
| 2011/0234545 | A1* | 9/2011 | Tanaka | G06F 3/0436 345/177 |
| 2012/0274609 | A1 | 11/2012 | Sheng et al. | |
| 2013/0120322 | A1* | 5/2013 | Tanaka | G06F 3/043 345/177 |
| 2014/0247250 | A1* | 9/2014 | Sheng | G06F 3/0436 345/177 |
| 2018/0032211 | A1* | 2/2018 | King | G06F 1/3262 |
| 2018/0341347 | A1* | 11/2018 | Yousefpor | G06F 3/04166 |
| 2019/0074833 | A1* | 3/2019 | Sheng | G01L 1/18 |

FOREIGN PATENT DOCUMENTS

| | | |
|---|---|---|
| KR | 10-0542801 B1 | 8/2004 |
| KR | 10-2015-0046924 A | 5/2015 |
| WO | WO 2011/119368 A1 | 9/2011 |

OTHER PUBLICATIONS

Yuan Liu et al., "An acoustic multi-touch sensing method using amplitude disturbed ultrasonic wave diffraction patterns", *Sensors and Actuators A: Physical*, 2010, vol. 162, No. 2, pp. 394-399.
International Search Report dated Feb. 21, 2020, in corresponding International Patent Application No. PCT/KR2019/013714.
Office Action dated Jul. 15, 2022, in Korean Application No. 10-2018-0125237.

* cited by examiner

DISPLAY APPARATUS AND CONTROL METHOD THEREOF

CROSS-REFERENCE TO RELATED APPLICATIONS

This application is a U.S. National Stage Application which claims the benefit under 35 U.S.C. § 371 of International Patent Application No. PCT/KR2019/013714 filed on Oct. 18, 2019, which claims foreign priority benefit under 35 U.S.C. § 119 of Korean Patent Application 10-2018-0125237 filed on Oct. 19, 2018, in the Korean Intellectual Property Office, the contents of both of which are incorporated herein by reference.

TECHNICAL FIELD

The disclosure relates to a display apparatus with a display panel to display an image and a method of controlling the same, and more particularly to a display apparatus, which has a structure to detect a user's touch position on a display panel and perform an operation corresponding to the corresponding position, and a method of controlling the same.

BACKGROUND ART

To compute and process predetermined information in accordance with certain processes, an electronic apparatus basically includes a central processing unit (CPU), a chipset, a memory, and the like electronic components for the computation. Such an electronic apparatus may be variously classified in accordance with what information is processed and what it is used for. For example, the electronic apparatus is classified into an information processing apparatus such as a personal computer (PC), a server or the like for processing general information; an image processing apparatus for processing image data; an audio apparatus for audio process; home appliances for miscellaneous household chores; etc. The image processing apparatus may be actualized by a display apparatus that displays processed image data as an image on its own display panel. As an example of realizing the image processing apparatus by a single display apparatus, there are a TV, a monitor, a portable multimedia player, a tablet computer, a mobile phone, etc. As an example of realizing the image processing apparatus by a plurality of display apparatuses, there is a video wall.

Among user interface environments provided in the display apparatus, there is a touch screen structure for detecting a touch position when a user touches a display panel in person. Various conventionally proposed touch screens include a resistive touch screen that detects pressure generated when a user presses the display panel, a capacitive touch screen that detects change in capacitance on the display panel due to a user's finger, an optical touch screen that detects a laser blocking position due to a user's touch through laser sensors installed surrounding the display panel and detects, etc.

However, such touch screens have problems as follows. The resistive touch screen lowers the brightness of a screen and decreases the sensitivity of process detection because resistive films are stacked on a display panel. The optical touch screen may not work when it is touched with a wet finger or a nonconductive material. The optical touch screen may be constrained by the price of a laser sensor and installation position. Further, the foregoing touch screens are required to enlarge their own touch-sensing structures or increase the number of sensors for a larger display panel, and thus it may be difficult to apply the foregoing touch screens to actual products in such a case.

Accordingly, to easily apply the structure of a touch screen to a display panel even though the display panel becomes larger, there is a need of providing a display apparatus capable of accurately detecting a position of a touch input with a simple structure.

DISCLOSURE

Technical Solution

In accordance with an embodiment, there is provided a display apparatus a display including a touch screen; a plurality of transducers provided to be spaced apart from each other at edges of the touch screen, and configured to transmit and receive an ultrasonic signal with respect to the touch screen; and a processor configured to identify a touch position on the touch screen based on the ultrasonic signal transmitted and received by the plurality of transducers, in which the transducer includes a plurality of electrodes arranged from an edge side of the touch screen toward an inner side of the touch screen, and a first electrode at the edge side among the plurality of electrodes is shorter than a second electrode at the inner side.

Here, the plurality of electrodes may be classified into a first group to which voltage of certain polarity is applied, and a second group to which voltage of opposite polarity to the first group is applied, and the electrodes of the first group and the electrodes of the second group may be alternately arranged in a direction toward the inner side of the touch screen.

Here, the plurality of electrodes may be extended being convexly curved toward the inner side of the touch screen.

Further, the processor may be configured to obtain a distance between the transducer and the touch position based on time from a point in time of transmitting the ultrasonic signal to a point in time of receiving the ultrasonic signal reflected by the touch position, and identify the touch position based on the obtained distance.

Here, the display apparatus may further include a storage configured to store a profile of a waveform of the ultrasonic signal detected when the touch is not performed, wherein the processor is configured to identify that the touch is performed at a point in time where vibration of a signal occurs, when the vibration not shown in the profile appears in the waveform of the received ultrasonic signal.

Further, the display apparatus may further include a storage configured to store a table in which distances respectively corresponding to a plurality of times are tabulated, wherein the processor is configured to obtain a distance between the transducer and the touch position by referencing the table.

Further, the display apparatus may further include a storage configured to store a preset operation expression of time and a distance, wherein the processor is configured to obtain a distance between the transducer and the touch position based on the operation expression.

Further, the plurality of transducers may include a transmitting module configured to vibrate the touch screen by applying an electric signal to the electrode to transmit the ultrasonic signal, and a receiving module adjacent to the transmitting module and configured to process the ultrasonic signal received through the electrode.

Further, the transducer may be configured to periodically alternate between a transmitting mode for transmitting the ultrasonic signal by applying an electric signal to the electrode to vibrate the touch screen and a signal receiving mode for receiving the ultrasonic signal through the electrode.

Further, in accordance with an embodiment, there is provided a method of controlling a display apparatus, the method including: by a plurality of transducers provided to be spaced apart from each other at edges of a touch screen, transmitting and receiving an ultrasonic signal with respect to the touch screen; and identifying a touch position on the touch screen based on the ultrasonic signal transmitted and received by the plurality of transducers, the transducer including a plurality of electrodes arranged from an edge side of the touch screen toward an inner side of the touch screen, and a first electrode at the edge side among the plurality of electrodes being shorter than a second electrode at the inner side.

Here, the plurality of electrodes may be classified into a first group to which voltage of certain polarity is applied, and a second group to which voltage of opposite polarity to the first group is applied, and the electrodes of the first group and the electrodes of the second group may be alternately arranged in a direction toward the inner side of the touch screen.

Here, the plurality of electrodes may be extended being convexly curved toward the inner side of the touch screen.

Further, the method may further include obtaining a distance between the transducer and the touch position based on time from a point in time of transmitting the ultrasonic signal to a point in time of receiving the ultrasonic signal reflected by the touch position, and identifying the touch position based on the obtained distance.

Here, the method may further include storing a profile of a waveform of the ultrasonic signal detected when the touch is not performed, and identifying that the touch is performed at a point in time where vibration of a signal occurs, when the vibration not shown in the profile appears in the waveform of the received ultrasonic signal.

Further, the method may further include storing a table in which distances respectively corresponding to a plurality of times are tabulated, and obtaining a distance between the transducer and the touch position by referencing the table.

Further, the method may further include storing a preset operation expression of time and a distance, and obtaining a distance between the transducer and the touch position based on the operation expression.

Further, the plurality of transducers may include a transmitting module configured to vibrate the touch screen by applying an electric signal to the electrode to transmit the ultrasonic signal, and a receiving module adjacent to the transmitting module and configured to process the ultrasonic signal received through the electrode.

Further, the transducer may be configured to periodically alternate between a transmitting mode for transmitting the ultrasonic signal by applying an electric signal to the electrode to vibrate the touch screen and a signal receiving mode for receiving the ultrasonic signal through the electrode.

BEST MODE

Below, embodiments will be described in detail with reference to accompanying drawings. Further, the embodiments described with reference to the accompanying drawings are not exclusive to each other unless otherwise mentioned, and a plurality of embodiments may be selectively combined within one apparatus. The combination of these plural embodiments may be discretionally selected and applied to realize the present inventive concept by a person having an ordinary skill in the art.

In the description of the embodiments, an ordinal number used in terms such as a first element, a second element, etc. is employed for describing variety of elements, and the terms are used for distinguishing between one element and another element. Therefore, the meanings of the elements are not limited by the terms, and the terms are also used just for explaining the corresponding embodiment without limiting the disclosure.

Further, a term "at least one" among a plurality of elements in the disclosure represents not only all the elements but also each one of the elements, which excludes the other elements or all combinations of the elements.

Figure 1:
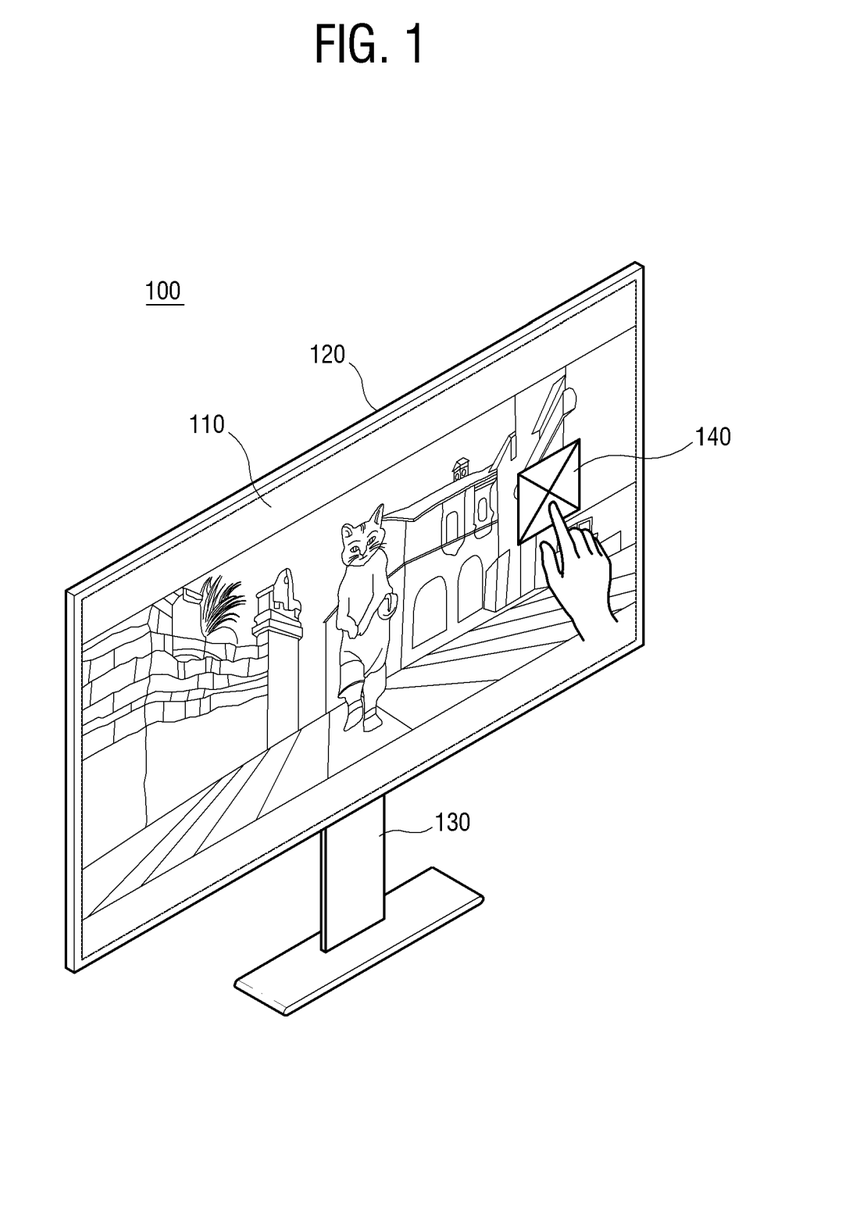
FIG. 1 is a perspective view of a display apparatus according to an embodiment of the disclosure.

FIG. 1 is a perspective view of a display apparatus according to an embodiment of the disclosure.

As shown in FIG. 1, an embodiment of the disclosure will be described with regard to a case where a television (TV) is provided as a display apparatus 100. However, the display apparatus 100 may include various kinds of apparatus without being limited to one of them, and the idea of the disclosure may be applicable to not only the TV but also various kinds of display apparatus 100 such as a monitor for a computer, an electronic frame, a video wall, a multi-media player, a tablet computer, a mobile display apparatus, a wearable device, etc.

The display apparatus 100, in terms of an outer appearance structure, includes a display panel 110 for displaying an image on a front panel, and a housing 120 for accommodating and supporting the display panel 110. When the display apparatus 100 is a stand type, the display apparatus 100 further includes a stand 130 for supporting the display panel 110 and the housing 120. When the display apparatus 100 is a mounting type, the display apparatus 100 is mountable to a wall without the stand 130.

The display apparatus 100 according to an embodiment of the disclosure employs a touch screen structure. When a user performs an input action such as touching, tapping, dragging, etc. at a predetermined position of an image displayed on the display panel 110 in person, the display apparatus 100 detects the occurrence of the input action. The display apparatus 100 identifies the position on the display panel 110 in which the input action is performed, and performs a preset function based on the identified position.

Functions implemented by the display apparatus 100 based on the position of the touch input may be variously given according to designs, user settings, etc. For example, when a user's touch input is detected on the display panel 110, the display apparatus 100 may identify the position where the touch input occurs, and display an on-screen-display (OSD) menu 140 to be popped up at the identified position. Alternatively, the display apparatus 100 may zoom in or zoom out an image with respect to the position where the occurrence of the touch input is identified.

To achieve the touch screen, the display apparatus 100 according to an embodiment of the disclosure includes a sensor provided to generate an electric wave on the display panel 110 or receive an electric wave propagating through the display panel 110. The touch screen structure using the sensor according to an embodiment will be described later.

Figure 2:
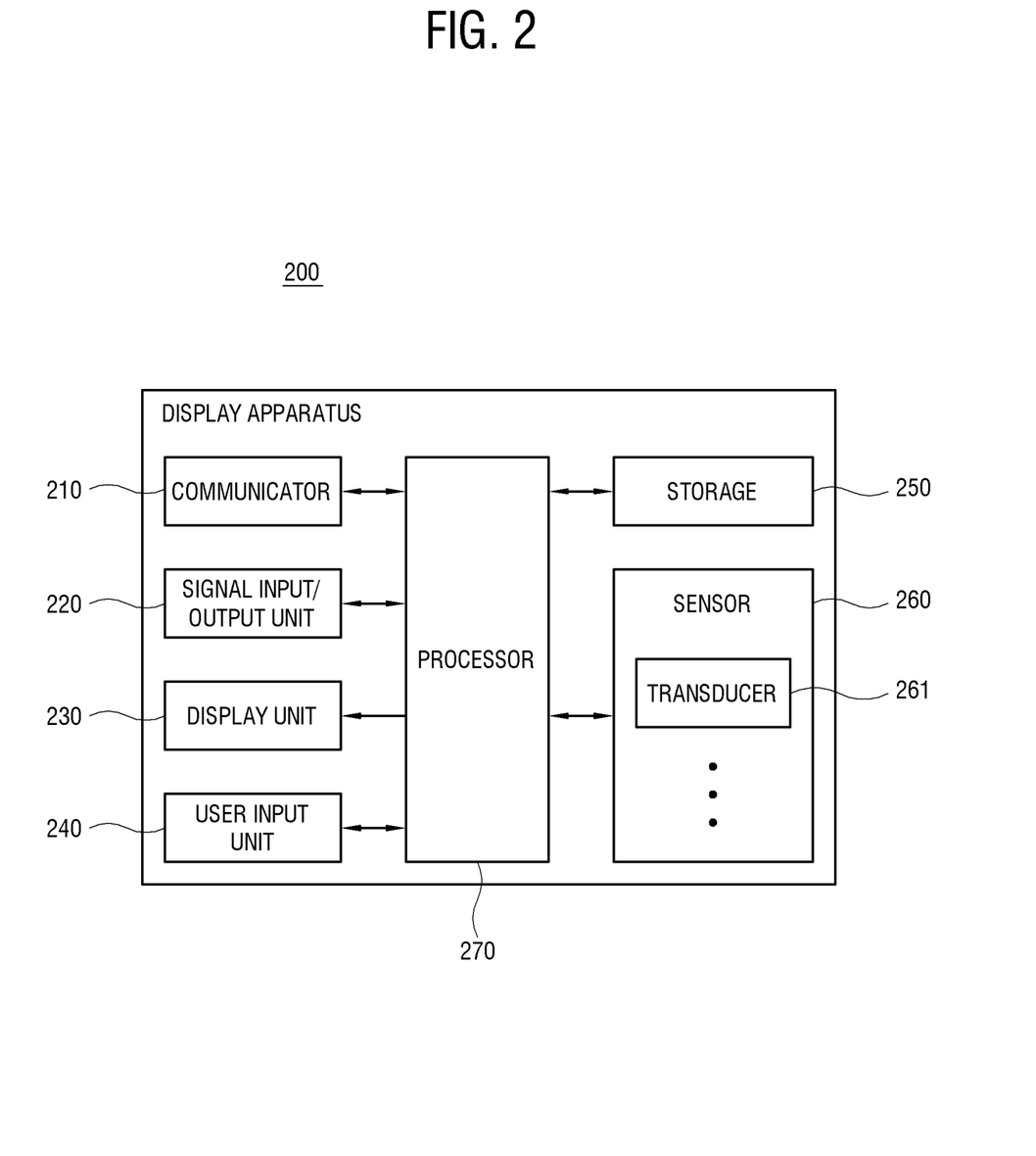
FIG. 2 is a block diagram of a display apparatus according to an embodiment of the disclosure.

FIG. 2 is a block diagram of a display apparatus according to an embodiment of the disclosure.

As shown in FIG. 2, a display apparatus 200 includes a communicator 210 configured to communicate with an external apparatus, a signal input/output unit 220 configured to input/output predetermined data such as an image signal, etc., a display unit 230 configured to display an image, a user input unit 240 configured to receive a user's input, a storage 250 configured to store data, a sensor 260 configured to detect a user's touch input onto the display unit 230, and a processor 270 configured to identify a touch position based on a detection result of the sensor 260.

The communicator 210 refers to an interactive communication circuit that includes at least one of elements, such as communication modules, communication chips, etc. corresponding to various wired and wireless communication protocols. For example, the communicator 210 may be actualized by a wireless communication module configured to perform wireless communication with an access point (AP) through Wi-Fi, or a local area network (LAN) connected to a router or a gateway by a wire.

The signal input/output unit 220 is one-to-one or one-to-many connected to a predetermined external apparatus, thereby receiving or outputting data with regard to the corresponding external apparatus. The signal input/output unit 220 includes a plurality of connectors or a plurality of ports, which for example complies with various standards such as high definition multimedia interface (HDMI), DisplayPort (DP), etc. The display apparatus 200 transmits and receives a signal to and from the external apparatus through the communicator 210 or the signal input/output unit 220.

The display unit 230 includes a display panel capable of displaying an image on a screen. The display panel is provided to have a light receiving structure such as a liquid crystal type, or a self-emissive structure such as a micro light emitting diode (LED) type. The display unit 230 may include an additional element according to the structures of the display panel. For example, when the display panel is the liquid crystal type, the display 330 includes a liquid crystal display panel, a backlight unit configured to emit light, a panel driving substrate configured to drive liquid crystal of the liquid crystal display panel, etc.

On the display unit 230, a touch screen is provided having a surface a user can touch. The touch screen may for example be a glass substrate at an outermost side of the display unit 230. The touch screen may be provided as included in the display unit 230 or separated from the display unit 230.

The user input unit 240 includes various input interfaces through which a user can make an input. The user input unit 240 may be variously configured according to the kinds of display apparatus 200, and may for example include mechanical or electronic buttons of the display apparatus 200, a remote controller separated from the display apparatus 200, etc.

The storage 250 is accessed by the processor 270, and performs operations such as reading, recording, modifying, deleting, updating, etc. for data under control of the processor 270. The storage 250 includes a flash memory, a hard disk drive (HDD), a solid state drive (SSD), and the like nonvolatile memory in which data is retained regardless of whether power is supplied or not; and a buffer, a random access memory (RAM) and the like volatile memory to which processing data is loaded.

The sensor 260 includes a plurality of transducers 261. The plurality of transducers 261 applies an ultrasonic signal to the touch screen, and receives a reflected signal transmitted through the touch screen. Here, the reflected signal is a signal generated as a detection signal propagating along the touch screen collides with a predetermined object. Further, the object may be the edge of the display unit 230, or a user's finger touching the touch screen.

Here, the transducer 261 may be divided into a transmitting module for transmitting the ultrasonic signal, and a receiving module for receiving the reflected signal. In this case, one transmitting module and one receiving module, which are adjacent to each other, forms a set, and such a plurality of sets are arranged along the edge of the display unit 230 or touch screen so as to be spaced apart from each other.

Alternatively, the transmitting module and the receiving module may be provided as not individual elements but a single transducer 261 that periodically alternates a signal transmitting mode and a signal receiving mode. For example, the transducer 261 may transmit a detection signal, i.e. an ultrasonic signal, and then switch the mode to receive a reflected ultrasonic signal. In other words, the transmitting module and the receiving module may be provided as separate elements that respectively operate in different modes, or may be integrated into a single transducer 261 that periodically switches the modes. Detailed principles of the transducer 261 will be described later.

The transducer 261 is coupled to the surface of the touch screen. There are many methods of coupling the transducer 261 to the touch screen, which may for example include a method of using a double-sided adhesive tape, a method of using a screw, a method of using a hooking structure, etc. When efficiency in transfer of physical vibration is taken into account, an adhesive method has an advantage. For example, epoxy resin may be used in coupling.

The processor 270 includes one or more hardware processors achieved by a central processing unit (CPU), a chipset, a microcontroller, circuit, etc. which are mounted on a printed circuit board (PCB). Alternatively, the processor 270 may be designed as a system on chip (SoC). The processor 270 include modules corresponding to various processes, such as a demultiplexer, a decoder, a scaler, an audio digital signal processor (DSP), an amplifier, etc., and some or all of the modules may be achieved by the SoC. For example, a demultiplexer, a decoder, a scaler, and the like module related to an image process may be achieved as an image processing SoC, and an audio DSP may be achieved as a chipset separated from the SoC.

The processor 270 is a hardware main agent to perform general operations of the display apparatus 200. In other words, the processor 270 executes a preset instruction stored in the storage 250, so that the operations of the display apparatus 200 can be performed. From a software point of view, a predetermined operation of the display apparatus 200 is performed by an operating system or a kernel, or an application running on the kernel, and the processor 270 performs calculation, process and control of data to execute the software. For example, the processor 270 executes the operating system or kernel of the display apparatus 200, and also executes an application or a program on the kernel, thereby performing the process.

In this embodiment, the processor 270 identifies a touch position based on a signal about a detection result transmitted from the sensor 260, and performs an operation corresponding to the identified position. However, the processor 270 may be designed not to identify the touch position, but a separate controller for identifying the touch position may be provided in the sensor 260.

Below, the structure of the transducer 261 will be described.

Figure 3:
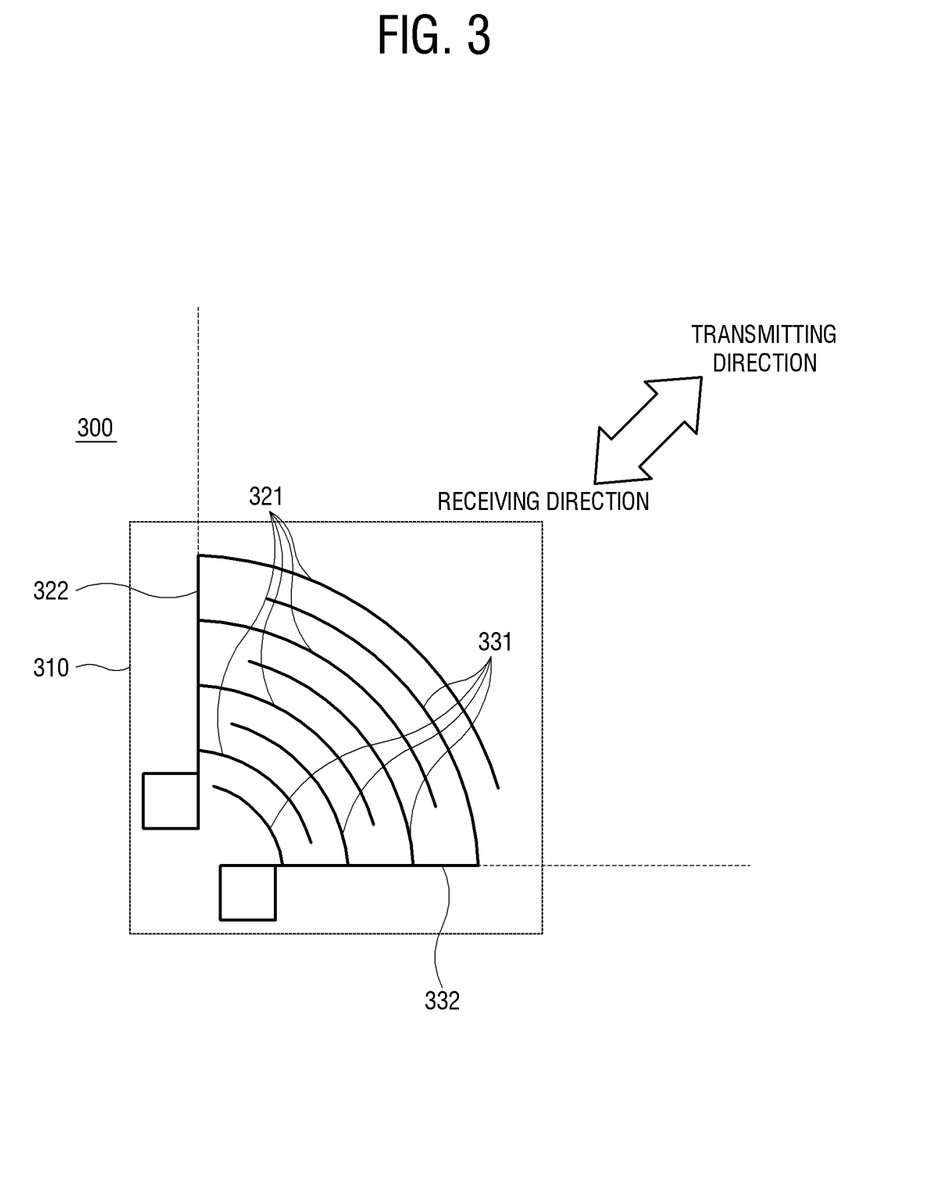
FIG. 3 is a plan view showing a structure of a transducer applied to a sensor according to an embodiment of the disclosure.

FIG. 3 is a plan view showing a structure of a transducer applied to a sensor according to an embodiment of the disclosure.

As shown in FIG. 3, a transducer 300 applied to the transmitting and receiving modules of the sensor according to this embodiment is configured for conversion between an electric signal and mechanical vibration. The transducer basically refers to a device that receives a certain form of energy, converts the corresponding form of the received energy into another form, and outputs the energy having the converted form. In this embodiment, the transducer 300 operates in either of a vibration or driving mode to receive an electric signal, convert the received electric signal into vibration, and output an ultrasonic wave, or a receiving mode to convert vibration into an electric signal when the vibration is detected, and output the electric signal. In other words, the transducer 300 operates in the vibration mode when it is used as the transmitting module, and operates in the receiving mode when it is used as the receiving module.

Alternatively, the transmitting module and the receiving module may be not separated as individual elements, but the transducer 300 may operate switching over between the vibration mode and the receiving mode.

The transducer 300 includes an energy conversion device 310, and a plurality of electrodes 321 and 331 provided on the energy conversion device 310 and driving the energy conversion device 310. Of course, the energy conversion device 310 used in the transducer 300 may include various types of elements. In this embodiment, lead zirconate titanate (PZT) element is used as the energy conversion device 310 because the PZT type element has a higher driving power than a polyvinylidene fluoride (PVDF) type element.

The transducer 300 transmits an ultrasonic wave toward a preset touch region, and receives a reflected wave as the ultrasonic wave is reflected from a predetermined object and returned. Here, the transducer 300 in this embodiment is provided to emit the ultrasonic wave in not all directions of 360 degrees but within a focused range as much as a predetermined angle. Likewise, the transducer 300 is provided to detect the reflected wave not in all directions of 360 degrees but within a range of a predetermined angle. To this end, the plurality of electrodes 321 and 331 of the transducer 300 are provided to have a structure as follows.

The plurality of electrodes 321 and 331 drives the energy conversion device 310 to vibrate based on an electric signal when the transducer 300 is in the vibration mode, and transmits the electric signal converted from the vibration by the energy conversion device 310 when the transducer 300 is in the receiving mode.

The plurality of electrodes 321 and 331 are extended in directions substantially perpendicular to propagating directions of the ultrasonic wave, and arranged in parallel with the propagating directions of the ultrasonic wave. The plurality of electrodes 321 and 331 is divided into a first electrode group 321 to which one of positive and negative voltages is applied, and a second electrode 331 to which the other voltage is applied. Further, the first electrode group 321 includes first wiring 322 communicating with one ends of the electrodes of the first electrode group 321, and the second electrode group 331 includes second wiring 332 communicating with one ends of the electrodes of the second electrode group 331.

The ultrasonic wave is transmitted from the transducer 300 not in a certain transmission direction but to spread in a fan shape substantially within a range of a predetermined angle. Therefore, each of the electrodes 321 and 331 is extended being convexly curved toward one central direction of a plurality of transmission directions spreading in the fan shape among the transmission directions of the ultrasonic wave. However, each of the electrodes 321 and 331 may be designed to be extended in a straight line perpendicular to the one central transmission direction.

Along the transmission directions of the ultrasonic wave, the electrodes of the first electrode group 321 and the electrodes of the second electrode group 331 are alternately arranged. For example, when the positive voltage is applied to the first electrode group 321 and the negative voltage is applied to the second electrode group 33, the electrodes 331 applied with the negative voltage are arranged between the electrodes 321 applied with the positive voltage.

Like this, when the electrodes 321 and 331 having opposite polarities are alternately arranged in the transducer 300, the wavelength or frequency generated in the transducer 300 is easily realized with a numerical value as designed. Further, the vibration is more efficiently generated in the transducer 300 because it is generated with not a single polarity but opposite polarities.

Here, the plurality of electrodes 321 and 331 are different in length from one another. Specifically, when the transducer 300 is placed at the edge of the touch screen, each of the electrodes 321 and 331 is relatively long as it becomes closer to the inside of the touch screen positioned in the transmission direction of the transducer 300, and relatively short as it becomes closer to the edge of the touch screen. In other words, the length of a first electrode placed at the edge of the touch screen among the plurality of electrodes 321 and 331 is shorter than the length of a second electrode placed at the inside of the touch screen among the plurality of electrodes 321 and 331. Therefore, the plurality of electrodes 321 and 331 is shaped like a fan spreading or expanding in the transmission direction of the ultrasonic wave.

Here, the range in which the ultrasonic wave propagates corresponds to the fanwise angle formed by the plurality of electrodes 321 and 331. In other words, lines joining the ends of the plurality of electrodes 321 and 331 are the first wiring 322 and the second wiring 332, and therefore the range in which the transducer 300 transmits the ultrasonic wave corresponds to an angle between the first wiring 322 and the second wiring 332.

The ultrasonic wave output from the transducer 300 and the ultrasonic wave received in the transducer 300 may include various kinds of electric waves, and a lamb wave is employed in this embodiment. The lamb wave is also called a plate wave. The lamb wave refers to an electric wave that propagates inside an elastic body of a thin plate, and is generated under specific conditions of a frequency, an incident angle, and a material thickness. To generate the lamb wave, the transducer 300 makes the longitudinal wave enter the surface of the touch screen obliquely. The obliquely incident longitudinal wave travels being repetitively reflected from the surfaces of the touch screen, and thus the longitudinal wave and the transverse wave are in a mixed mode. The lamb wave is generated at only a specific incident angle in which such destruction does not occur. The reason why the lamb wave is used in this embodiment is because the electric wave propagating on the touch screen shaped like a thin plate is easily detected and measured. For example, the transducer 300 oscillates at a frequency of 30 kHz to several hundreds of kHz, thereby generating the lamb wave on the surface of the touch screen.

Figure 4:
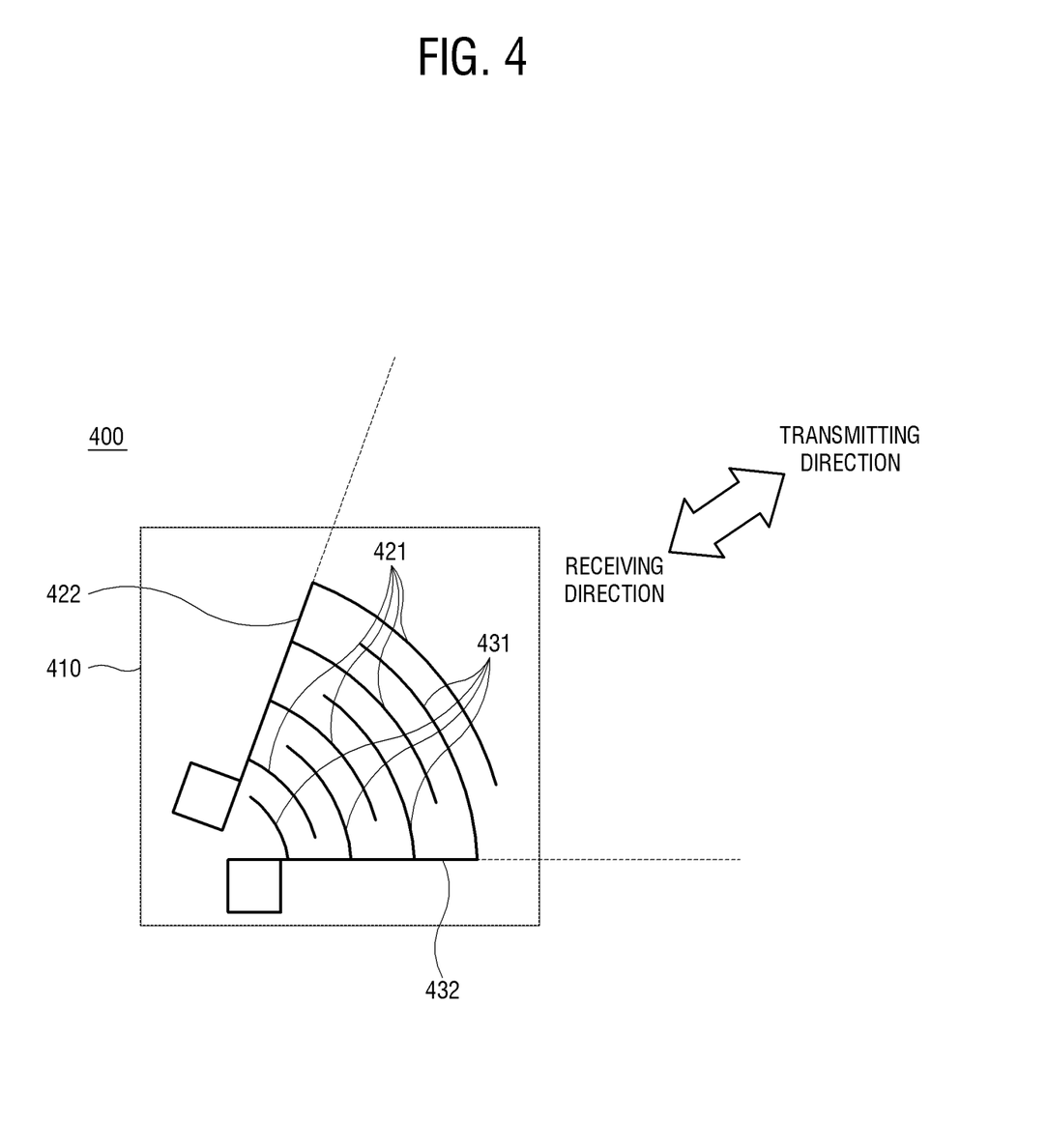
FIG. 4 is a plan view showing a structure of a transducer more improved in directionality as compared with the transducer of FIG. 3.

FIG. 4 is a plan view showing a structure of a transducer more improved in directionality as compared with the transducer of FIG. 3.

As shown in FIG. 4, a transducer 400 includes an energy conversion device 410, and a plurality of electrodes 421 and 431 provided on the energy conversion device 410 and driving the energy conversion device 410. The plurality of electrodes 421 and 431 is divided into a first electrode group 421 to which one of positive and negative voltages is applied, and a second electrode 431 to which the other voltage is applied. Further, the first electrode group 421 includes first wiring 422 communicating with one ends of the electrodes of the first electrode group 421, and the second electrode group 431 includes second wiring 432 communicating with one ends of the electrodes of the second electrode group 431.

The transducer 400 in this embodiment operates on substantially the same principle as the foregoing transducer of FIG. 3. Even in the transducer 400 according to this embodiment, the length of the electrodes 421 and 431 increases as it is placed toward the transmission direction of the ultrasonic wave. However, the transducer 400 in this embodiment has a fanwise angle formed by the plurality of electrodes 421 and 431 than the foregoing transducer of FIG. 3.

As such an angle increases, a region in which the transducer 400 is capable of transmitting and receiving the ultrasonic wave becomes wider but an available distance in which the transducer 400 is capable of transmitting and receiving the ultrasonic wave becomes shorter. On the other hand, as such an angle decreases, the region in which the transducer 400 is capable of transmitting and receiving the ultrasonic wave becomes narrower but the available distance in which the transducer 400 is capable of transmitting and receiving the ultrasonic wave becomes longer. Therefore, the angle for transmitting and receiving the ultrasonic wave, formed by the plurality of electrodes 421 and 431 of the transducer 400, may have various numerical values depending on various factors such as the size of the display unit, etc.

In this embodiment, the reason why the directionality structure of the signal is applied to the transducer 400 is as follows.

For example, if the directionality structure is not applied to the transducer 400, the ultrasonic wave is emitted 360 degrees from the transducer 400. In this case, the ultrasonic wave propagating not frontward, i.e. toward the touch region but backward is reflected from the edge of the touch screen and changed into the reflected wave, and the reflected wave travels along a changed route. The reflected wave interferes with the ultrasonic wave propagating frontward from the first, thereby lowering accuracy of touch detection. Thus, according to an embodiment, the directionality is given to the transducer 400, thereby eliminating interference and enhancing the accuracy of the touch detection.

Further, if the transducer 400 emits the ultrasonic wave 360 degrees, signal strength relatively suddenly decreases as distance from the transducer 400 increases, thereby reducing a range of detecting a touch. Thus, the transducer 400 in this embodiment has the directionality to focus a signal within a specific angle range, thereby reducing dissipation and dispersion of vibration energy. In result, a range of detecting touch based on the transducer 400 according to this embodiment is relatively expanded.

Further, when there are a plurality of signal transceivers, in which the transmitting modules and the receiving modules of the transducer 400 form pairs, it is easy to distinguish between a direct wave and a reflected wave from the signal received in the receiving module. In this regard, details will be described later.

Meanwhile, this embodiment describes that the range of transmitting and receiving the ultrasonic wave is varied depending on the shape and structure of the electrodes 421 and 431 arranged on the energy conversion device 410 shaped like a plate. Alternatively, the energy conversion device 410 may be shaped corresponding to the shape and structure of the electrodes 421 and 431. Although both the former and latter cases are possible, the former case has an advantage over the latter case when easiness of manufacture is taken into account.

Below, a principle that the transducer 400 with the foregoing structure identifies a touch position on a touch screen will be described.

Figure 5:
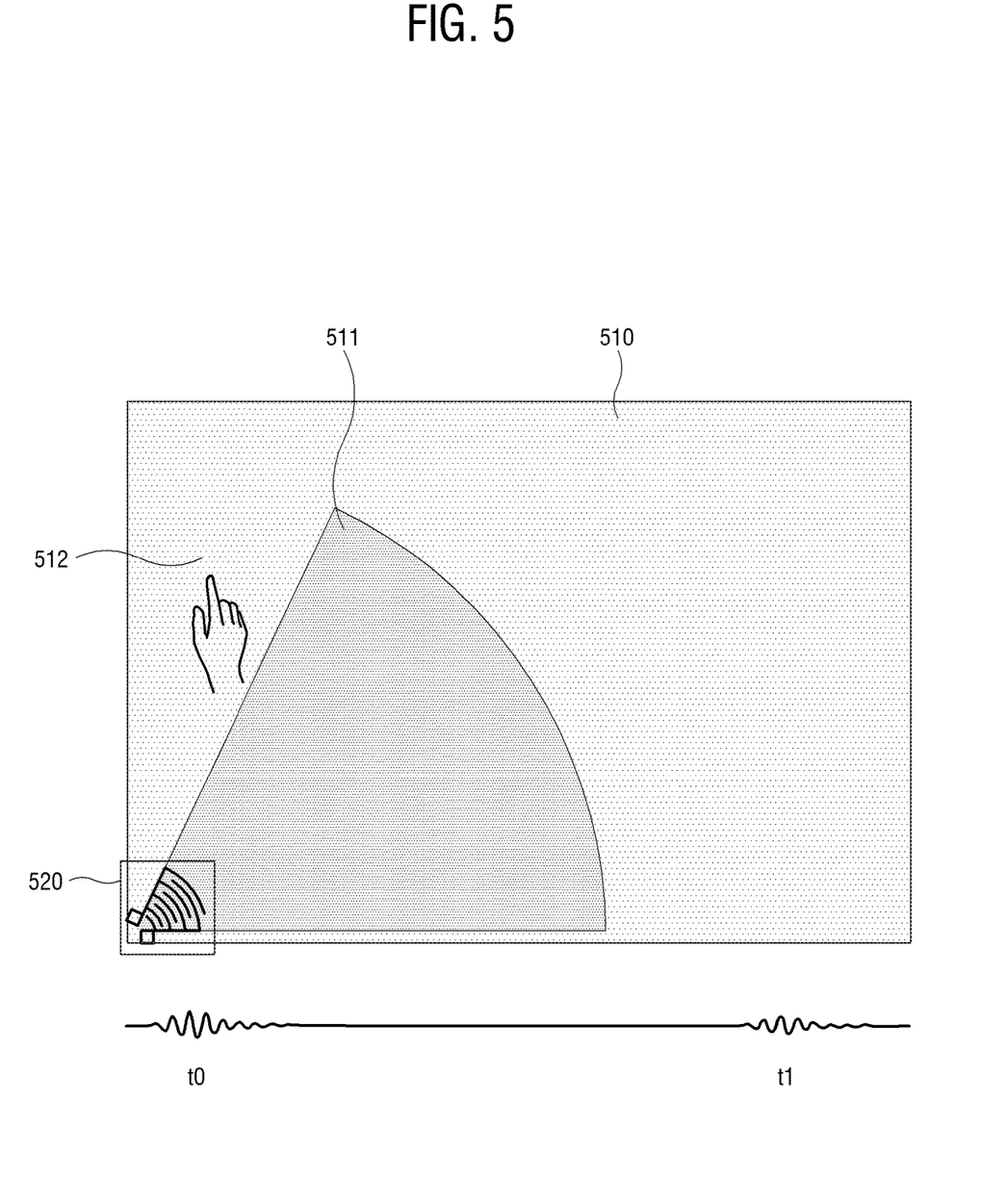
FIG. 5 illustrates an example of a detection signal detected when a user touches an outside of a range covered by a transducer in a display apparatus according to an embodiment of the disclosure.

FIG. 5 illustrates an example of a detection signal detected when a user touches an outside of a range covered by a transducer in a display apparatus according to an embodiment of the disclosure.

As shown in FIG. 5, it will be for example assumed that a transducer 520 is provided on the surfaced of a touch screen 510 and detects a reflected wave caused by a user's touch. As described above, because of the structural characteristics that the energy conversion device or the electrode of the transducer 520 has, the whole region of the touch screen 510 may be divided into a first region 511 covered by the transducer 520 and a second region 512 not covered by the transducer 520. In other words, the first region 511 refers to a region ranging within an angle of transmitting and receiving the signal of the transducer 520, but the second region 512 refers to a region ranging beyond the angle.

Detection of a user's touch is identified by the processor, based on operation timing between the transducer 520 in the vibration mode and the transducer 520 in the receiving mode. FIG. 5 shows only one transducer 520, but a plurality of pairs of transducers 520 corresponding to the modes are actually provided. In this regard, details will be described later.

When the transducer 520 in the vibration mode transmits an ultrasonic wave, the ultrasonic wave is reflected and returned from the edge of the touch screen 510 and changed into the reflected wave, and the transducer 520 in the receiving mode receives the reflected wave. The generated ultrasonic wave and the received reflected wave in the transducer 520 may be plotted on a waveform graph of time and signal strength. The waveform in FIG. 5 shows that the strength of the waveform fluctuates at points in time t0 and t1. The point in time t0 refers to timing at which the transducer 520 in the vibration mode transmits the ultrasonic wave, and the point in time t1 refers to timing at which the transducer 520 in the receiving mode receives the reflected wave.

Such a waveform appears when a user does not touch the first region 511, in other words, when a user does not touch any region on the touch screen 510 or touches the second region 512. The second region 512 is out of the transmitting and receiving angle range of the transducer 520, and therefore the reflected wave is not received in the transducer 520 even though a user touches the second region 512. To avoid such a break in touch detection, a plurality of signal transceivers are arranged being spaced apart from one another.

Figure 6:
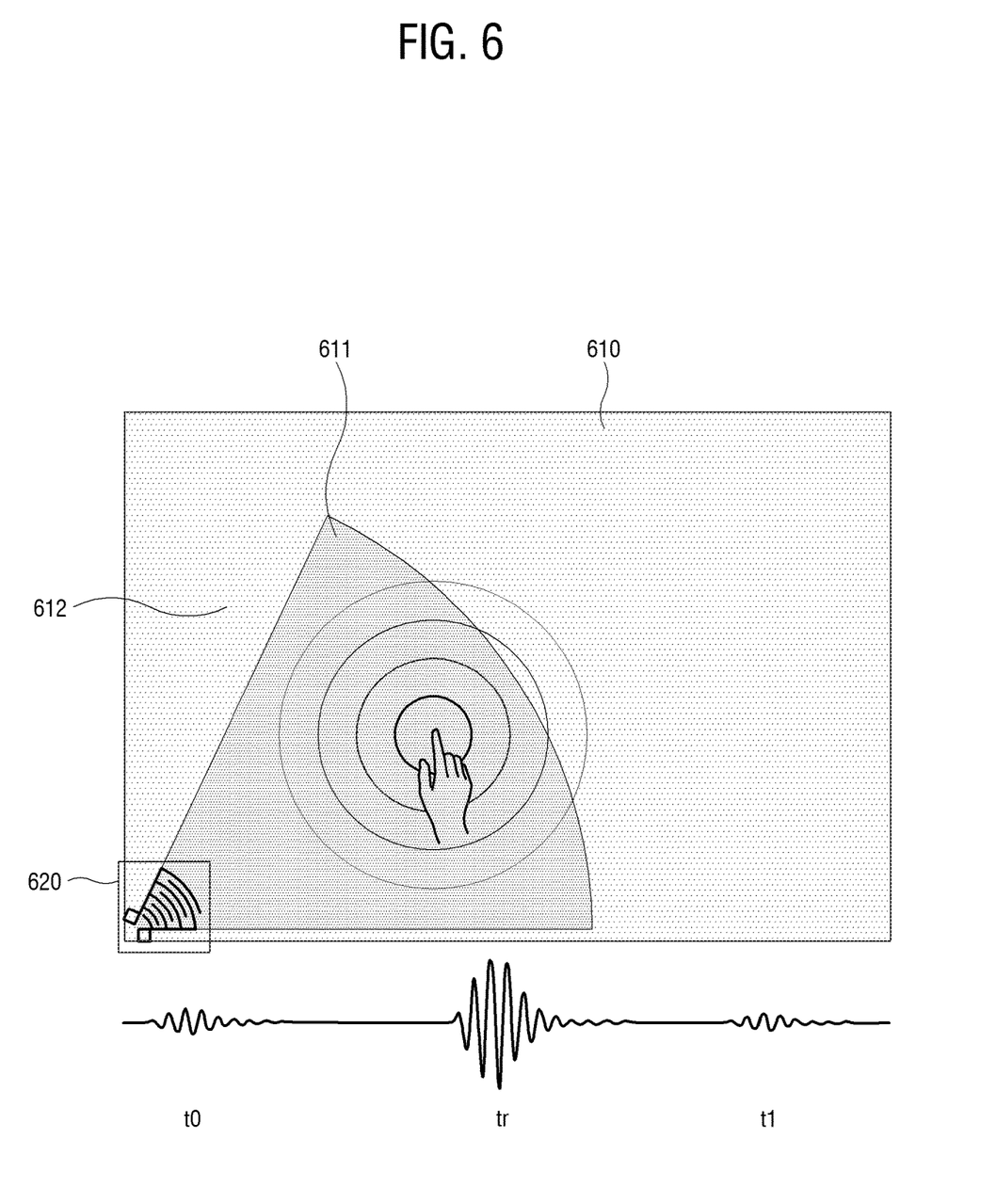
FIG. 6 illustrates an example of a detection signal detected when a user touches an inside of a range covered by a transducer in a display apparatus according to an embodiment of the disclosure.

FIG. 6 illustrates an example of a detection signal detected when a user touches an inside of a range covered by a transducer in a display apparatus according to an embodiment of the disclosure.

As shown in FIG. 6, for convenience of description, a touch screen 610 may be divided into a first region 611 covered by a transducer 620 and a second region 612 not covered by the transducer 620. When a user touches the first region 611 while the transducer 620 in the vibration mode is transmitting an ultrasonic wave, part of the ultrasonic wave is converted into a reflected wave at a position that a user touches, and the other part of the ultrasonic wave collides with the edge of the touch screen 610 and is converted into a reflected wave. The transducer 620 in the receiving mode receives such two kinds of reflected waves, in which, for convenience, the reflected wave generated colliding with the edge of the touch screen 610 will be called a first reflected wave, and the reflected wave generated due to a user's touch will be called a second reflected wave.

In this case, the fluctuating strength of the waveform appears at a point in time t0 when the ultrasonic wave is generated by the transducer 620 and a point in time t1 when the first reflected wave is received in the transducer 620. Such a detection result is the same as that of when a user's touch is not detected.

On the other hand, the fluctuating strength of the waveform appears at a point in time t3 between the points in time t0 and t1. The point in time tr refers to timing at which the second reflected wave is received in the transducer 620, and thus the vibration of the waveform is detected based on the second reflected wave at the point in time tr. On the assumption that the ultrasonic wave and the reflected wave propagate at constant speed until the ultrasonic wave is generated and changed into the reflected wave and returns to the transducer 620, it is regarded that a distance from the transducer 620 to a user's touch position corresponds to time (tr−t0).

When the processor identifies a touch position, the processor regards a waveform corresponding to a user's no touch as a default. In other words, when the strength of the signal fluctuates beyond a threshold at a separate point in time tr except the point in time t1 at which the strength of the signal basically fluctuates due to the structure of the display apparatus, the processor identifies that the received reflected wave is caused by a user's touch at the corresponding point in time tr.

The processor measures time between a point in time when the transducer 620 generates the ultrasonic wave and a point in time when the transducer 620 receives the reflected wave. When the processor identifies that the measured time is not (t1−t0), i.e. that the received reflected wave is caused by a user's touch, the processor obtains a distance corresponding to the measured time and identifies a user's touch position based on the obtained distance.

When a signal travels at constant speed, a traveling time and a traveling distance of the signal are proportional to each other. Therefore, the processor can obtain the distance matching the measured time by referencing a look-up table (LUT) where time and matching distances are previously tabulated, calculating the time and the distance based on a preset operation expression, or the like method.

Below, it will be described that a sensor with the transducer 620 is installed on a touch screen.

Figure 7:
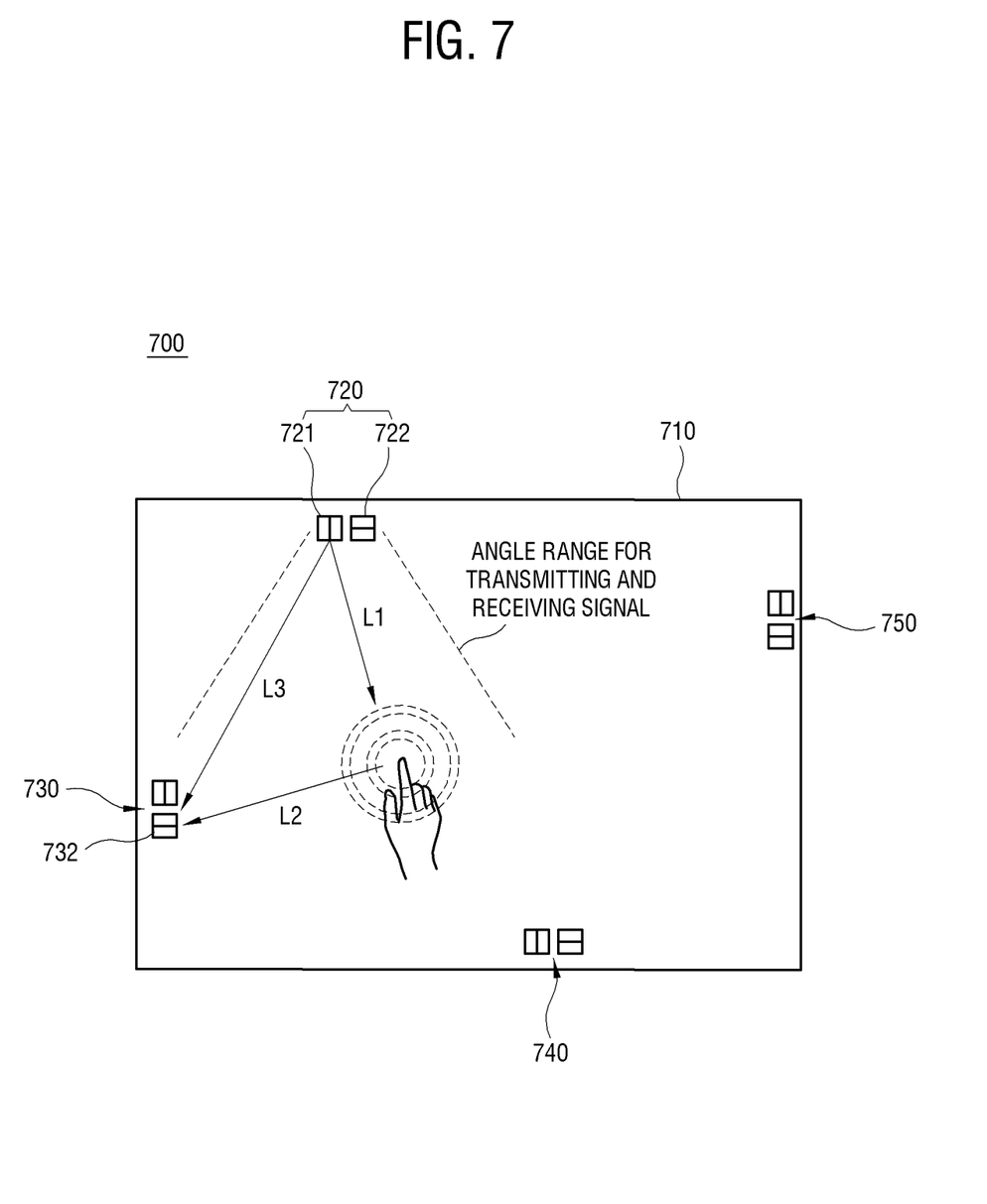
FIG. 7 illustrates that sensors are installed on a display panel of a display apparatus according to an embodiment of the disclosure.

FIG. 7 illustrates that sensors are installed on a display panel of a display apparatus according to an embodiment of the disclosure.

As shown in FIG. 7, a display apparatus 700 includes a touch screen 710 displaying an image, and sensors detecting a user's touch input generated on the touch screen 710. The sensor includes a plurality of signal transceivers 720, 730, 740 and 750 arranged being spaced apart from one another on the touch screen 710. Each of the signal transceivers 720, 730, 740 and 750 includes a transmitting module 721 and a receiving module 722 which are adjacent to each other and form a pair. As described above, the transmitting module 721 and the receiving module 722 operate in modes corresponding to functions to be respectively implemented by the transmitting module 721 and the receiving module 722 as the transducers are applied thereto.

Each of the signal transceivers 720, 730, 740 and 750 does not have an omnidirectional range of transmitting and receiving an ultrasonic wave, a reflected wave or the like signal, but has directionality in a predetermined direction. Therefore, the signal transceivers 720, 730, 740 and 750 are arranged on the edges of the touch screen 710 or around the edges of the touch screen 710, and an angle range for transmitting and receiving the signal in each of the signal transceivers 720, 730, 740 and 750 faces toward the inside of the touch screen 710. Thus, the surface of the touch screen 710 becomes the touch region in which a touch input is detected by the plurality of signal transceivers 720, 730, 740 and 750.

Further, the signal transceivers 720, 730, 740 and 750 are arranged to be spaced apart from each other along the edges of the touch screen 710. In a case of a large-sized touch screen 710, one of the signal transceivers 720, 730, 740 and 750 is not enough to cover the whole region of the touch screen 710, and thus the signal transceivers 720, 730, 740 and 750 are provided to share and cover the whole region of the touch screen 710. The number and position of signal transceivers 720, 730, 740 and 750 arranged on the touch screen 710 are varied depending on various factors such as the size of the touch screen 710, the aspect ratio of the touch screen 710, the angle range for transmitting and receiving the signal in the signal transceivers 720, 730, 740 and 750, etc.

With such a structure where the plurality of signal transceivers 720, 730, 740 and 750 are installed being spaced apart from each other on the touch screen 710, when the transmitting module 721 of a certain signal transceiver 720 transmits a transmission wave and a reflected wave is generated by a user's touch, the receiving modules of other signal transceivers 730, 740 and 750 as well as the receiving module 722 of the signal transceiver 720 can receive the reflected wave. In this case, the receiving modules of other signal transceivers 730, 740 and 750 receive not only the reflected wave but also the transmission wave directly transmitted from the transmitting module 721, i.e. the direct wave.

For example, when the transmitting module 721 of the signal transceiver 720 transmits an ultrasonic signal, part L1 of the ultrasonic signal is changed into a reflected wave L2 by a user's touch. The reflected wave L2 is received in a receiving module 732 of another signal transceiver 730. However, the receiving module 732 receives not only the reflected wave L2 but also part L3 of the ultrasonic signal from the transmitting module 721, i.e. a direct wave directly transmitted to the receiving module 732. In other words, the signal received in the receiving module 732 includes the reflected wave part L2 and the direct wave part L3.

The signal strength of the reflected wave is usually weaker than that of the direct wave, and it is therefore difficult to detect the reflected wave when the direct wave and the reflected wave are mixed. Thus, the directionality is given to the transducer applied to each of the signal transceivers 720, 730, 740 and 750 so as to narrow the range for transmitting and receiving the signal, thereby lessening the effect of the direct wave as compared with the effect of the reflected wave in the signal received in the receiving modules of other signal transceivers 730, 740 and 750. Thus, it is possible to improve accuracy in detecting a touch.

Figure 8:
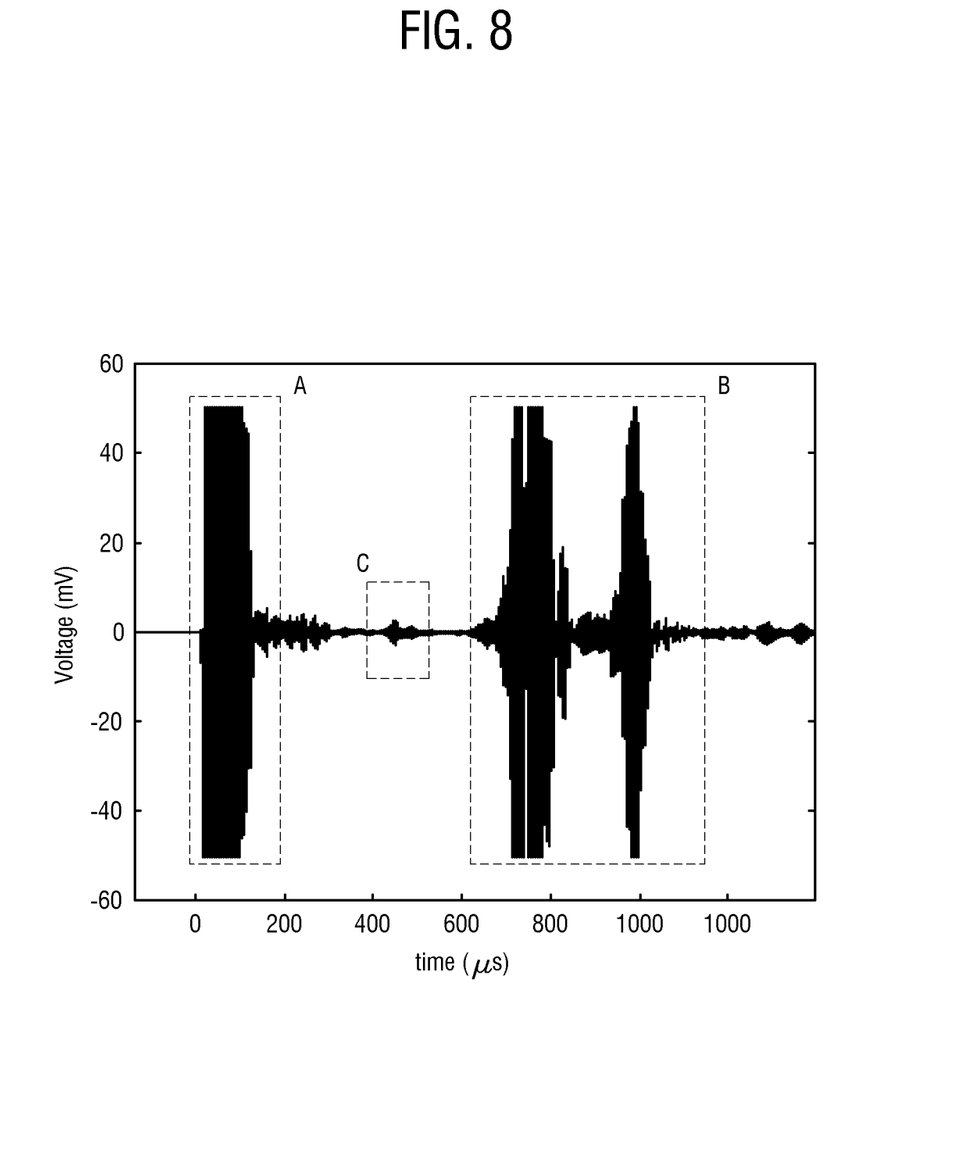
FIG. 8 is a waveform graph showing a result of detecting a reflected wave when a display apparatus according to an embodiment of the disclosure detects a user touch.

FIG. 8 is a waveform graph showing a result of detecting a reflected wave when a display apparatus according to an embodiment of the disclosure detects a user touch.

As shown in FIG. 8, waveforms of an ultrasonic wave and a reflected wave, which are detected in a state that a plurality of signal transceivers are installed upper and lower edges of a touch screen of a display apparatus, may be measured and then plotted on a graph. In FIG. 8, 'A' indicates a waveform of when an ultrasonic wave, i.e. a direct wave transmitted from a transmitting module of a certain signal transceiver is directly received in a receiving module of the same signal transceiver. Because the transmitting module and the receiving module are adjacent to each other in a certain signal transceiver, a point in time of the waveform 'A' may be substantially regarded as timing at which the transmitting module transmits the ultrasonic wave.

'B' indicates a waveform of when an opposite edge facing an edge of a touch screen, at which the certain signal transceiver is placed, receives a reflected wave in a receiving module. An interval between the waveforms 'A' and 'B' refers to time taken until the ultrasonic wave starts from a certain edge of the touch screen and returns after colliding with an opposite edge.

However, when a signal, the strength of which is enough to fluctuate beyond a threshold, is detected between the point in time of the waveform 'A' and the point in time of the waveform 'B' like a waveform 'C', it may be identified that the waveform C corresponds to the reflected wave caused by a user's touch. However, as shown in the graph of FIG. 8, the strength of the reflected wave caused by a user's touch is noticeably weaker than the strength of the direct wave directly received in the receiving module or the reflected wave cased by the edge of the touch screen. Therefore, as previously described in the foregoing embodiment, the directionality structure is applied to the transducers for the transmitting module and the receiving module, and the plurality of signal transceivers are arranged to be spaced apart from each other, thereby excluding the direct wave from the signal received in each receiving module if possible and more easily detecting the reflected wave caused by a user's touch.

Below, a method by which a display apparatus according to an embodiment of the disclosure detects a user's touch position.

Figure 9:
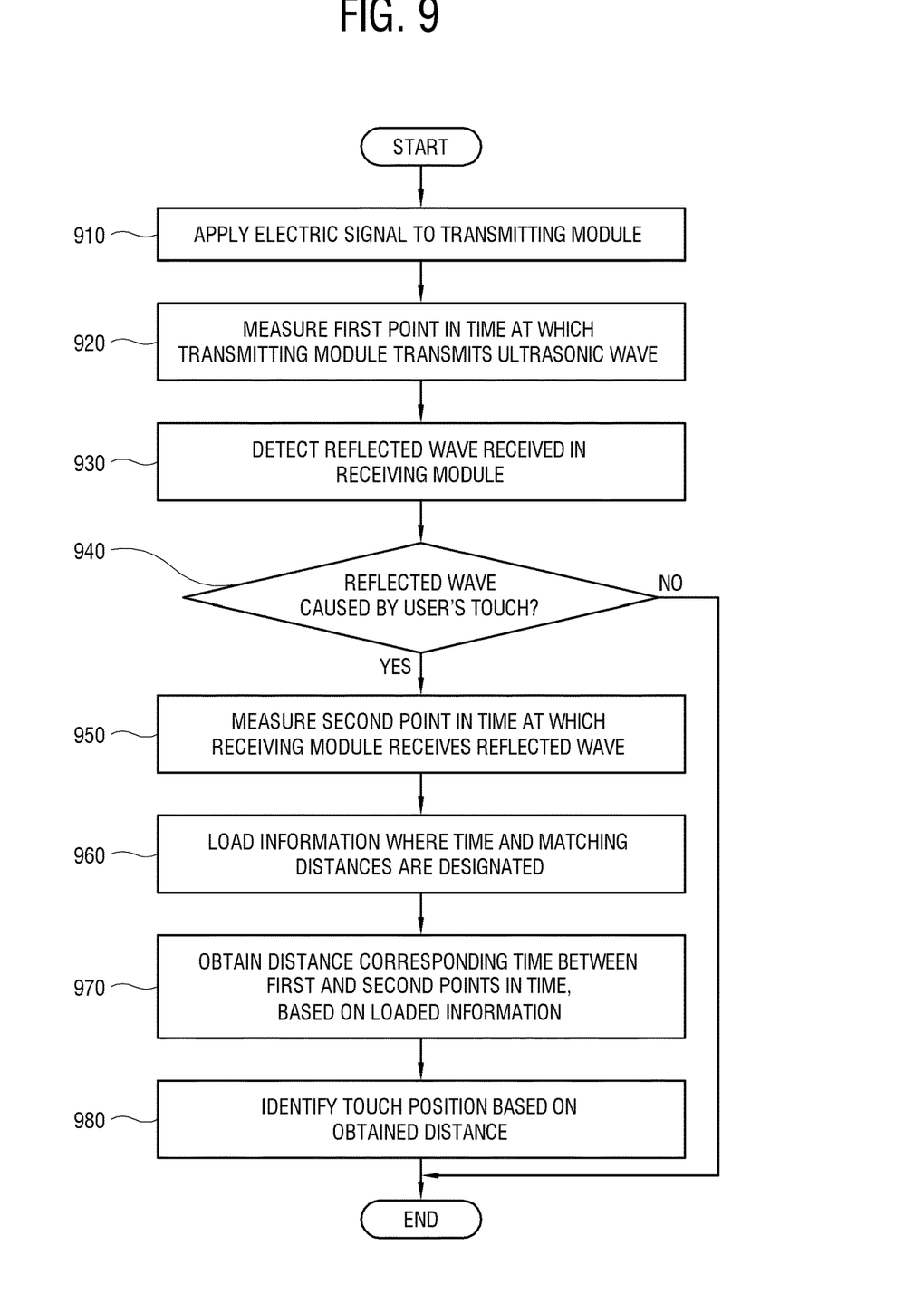
FIG. 9 is a flowchart showing a method by which a display apparatus according to an embodiment of the disclosure detects a user's touch position.

FIG. 9 is a flowchart showing a method by which a display apparatus according to an embodiment of the disclosure detects a user's touch position.

As shown in FIG. 9, the following operations are performed by the processor of the display apparatus.

At operation 910, the display apparatus applies an electric signal to a transmitting module so that the transmitting module can transmit an ultrasonic wave.

At operation 920 the display apparatus measures a first point in time when the transmitting module transmits the ultrasonic wave.

At operation 930 the display apparatus detects a reflected wave received in a receiving module.

At operation 940 the display apparatus identifies whether the detected reflected wave is caused by a user's touch. There are many identifying methods, and for example the display apparatus may identify that vibration of a signal is caused by a user's touch when the vibration does not match a profile of a waveform graph plotted by a reflected wave corresponding to a user's no touch. When it is identified that the detected reflected wave is not caused by a user's touch, the display apparatus does not perform any specific operation.

When it is identified that the detected reflected wave is caused by a user's touch, at operation 950 the display apparatus measures a second point in time when the receiving module receives the reflected wave.

At operation 960 the display apparatus loads information in which distances corresponding to points in time are previously stored. This information may include an LUT where a plurality of times and matching distances are tabulated, or an operation expression of time and a distance.

At operation 970 the display apparatus obtains a distance corresponding to time between a first point in time and a second point in time based on the loaded information.

At operation 980 the display apparatus identifies a touch position based on the obtained distance. For example, when the distances are obtained from the plurality of receiving modules based on the foregoing operations, the display apparatus may identify the touch position on the touch screen based on the plurality of distances obtained according to the receiving modules. This method is based on a simple mathematical principle, and therefore detailed descriptions thereof will be omitted.

The operations of the apparatus described in the foregoing embodiments may be performed by artificial intelligence provided in the corresponding apparatus. The artificial intelligence may be applied to various general systems by utilizing a machine learning algorithm. An artificial intelligence system refers to a computer system with intelligence of a human or being second to a human. In such a system, a machine, an apparatus or a system autonomously performs leaning and identifying and is improved in accuracy of recognition and identification based on accumulated experiences. The artificial intelligence is based on elementary technology by utilizing machine learning (deep-running) technology and algorithms based on an algorithm of autonomously classifying and learning features of input data, and copying perception, identification and the like functions of a human brain.

The elementary technology may for example include at least one of language comprehension technology for recognizing a language and a text of a human, visual understanding technology for recognizing a thing like a human sense of vision, inference and prediction technology for identifying information and logically making inference and prediction, knowledge representation technology for processing experience information of a human into knowledge data, and motion control technology for controlling a vehicle's automatic driving or a robot's motion.

Here, linguistic comprehension refers to technology of recognizing, applying and processing a human's language or text, and includes natural language processing, machine translation, conversation system, question and answer, voice recognition and synthesis, etc.

Inference and prediction refer to technology of identifying information and logically making prediction, and includes knowledge- and probability-based inference, optimized prediction, preference-based plan, recommendation, etc.

Knowledge representation refers to technology of automating a human's experience information into knowledge data, and includes knowledge building such as data creation and classification, knowledge management such as data utilization, etc.

The methods according to the foregoing embodiments may be achieved in the form of a program command that can be implemented in various computers, and recorded in a computer readable medium. Such a computer readable medium may include a program command, a data file, a data structure or the like, or combination thereof. For example, the computer readable medium may be stored in a voltage or nonvolatile storage such as a read only memory (ROM) or the like, regardless of whether it is deletable or rewritable, for example, a RAM, a memory chip, a device or integrated circuit (IC) or the like memory, or an optically or magnetically recordable or machine (e.g., a computer)-readable storage medium, for example, a compact disk (CD), a digital versatile disk (DVD), a magnetic disk, a magnetic tape or the like. It will be appreciated that a memory, which can be included in a mobile terminal, is an example of the machine-readable storage medium suitable for storing a program having instructions for realizing the embodiments. The program command recorded in this storage medium may be specially designed and configured according to the embodiments, or may be publicly known and available to those skilled in the art of computer software.

The invention claimed is:

1. A display apparatus comprising:
a display comprising a touch screen;
a plurality of transducers provided to be spaced apart from each other at edges of the touch screen, and configured to transmit and receive an ultrasonic signal with respect to the touch screen, wherein each of the plurality of transducers has a detection direction for detecting a touch input, and is disposed at each of a plurality of divided areas of the touch screen such that the detection direction of one of the plurality of transducers is toward a corresponding one of the plurality of divided areas; and
a processor configured to, based on the ultrasonic signal received by one of the plurality of transducers due to the touch input on the corresponding divided area, identify a touch position on the touch screen,
the transducer comprising a plurality of electrodes arranged from an edge side of the touch screen toward an inner side of the touch screen along the detection direction, and
a first electrode at the edge side among the plurality of electrodes being shorter than a second electrode at the inner side and each of the plurality of electrodes is extended being convexly curved toward the detection direction such that the plurality of electrodes forms a fan shape.

2. The display apparatus according to claim 1, wherein the plurality of electrodes are classified into a first group to which voltage of certain polarity is applied, and a second group to which voltage of opposite polarity to the first group is applied, and
the electrodes of the first group and the electrodes of the second group are alternately arranged in a direction toward the inner side of the touch screen.

3. The display apparatus according to claim 2, wherein the plurality of electrodes are extended being convexly curved toward the inner side of the touch screen.

4. The display apparatus according to claim 1, wherein the processor is configured to obtain a distance between the transducer and the touch position based on time from a point in time of transmitting the ultrasonic signal to a point in time of receiving the ultrasonic signal reflected by the touch position, and identify the touch position based on the obtained distance.

5. The display apparatus according to claim 4, further comprising a storage configured to store a profile of a waveform of the ultrasonic signal detected when the touch is not performed,
wherein the processor is configured to identify that the touch is performed at a point in time where vibration of a signal occurs, when the vibration not shown in the profile appears in the waveform of the received ultrasonic signal.

6. The display apparatus according to claim 4, further comprising a storage configured to store a table in which distances respectively corresponding to a plurality of times are tabulated,
wherein the processor is configured to obtain a distance between the transducer and the touch position by referencing the table.

7. The display apparatus according to claim 4, further comprising a storage configured to store a preset operation expression of time and a distance,
wherein the processor is configured to obtain a distance between the transducer and the touch position based on the operation expression.

8. The display apparatus according to claim 1, wherein the plurality of transducers comprises a transmitting module configured to vibrate the touch screen by applying an electric signal to the electrode to transmit the ultrasonic signal, and a receiving module adjacent to the transmitting module and configured to process the ultrasonic signal received through the electrode.

9. The display apparatus according to claim 1, wherein the transducer is configured to periodically alternate between a transmitting mode for transmitting the ultrasonic signal by applying an electric signal to the electrode to vibrate the touch screen and a signal receiving mode for receiving the ultrasonic signal through the electrode.

10. A method of controlling a display apparatus, the method comprising:
by a plurality of transducers provided to be spaced apart from each other at edges of a touch screen, transmitting and receiving an ultrasonic signal with respect to the touch screen, wherein each of the plurality of transducers has a detection direction for detecting a touch input, and is disposed at each of a plurality of divided areas of the touch screen such that the detection direction of one of the plurality of transducers is toward a corresponding one of the plurality of divided areas; and based on the ultrasonic signal received by one of the plurality of transducers due to the touch input on the corresponding divided area, identifying a touch position on the touch screen, the transducer comprising a plurality of electrodes arranged from an edge side of the touch screen toward an inner side of the touch screen along the detection direction, and a first electrode at the edge side among the plurality of electrodes being shorter than a second electrode at the inner side and each of the plurality of electrodes is extended being convexly curved toward the detection direction such that the plurality of electrodes forms a fan shape.

11. The method according to claim 10, wherein the plurality of electrodes are classified into a first group to which voltage of certain polarity is applied, and a second group to which voltage of opposite polarity to the first group is applied, and the electrodes of the first group and the electrodes of the second group are alternately arranged in a direction toward the inner side of the touch screen.

12. The method according to claim 11, wherein the plurality of electrodes are extended being convexly curved toward the inner side of the touch screen.

13. The method according to claim 10, further comprising:

obtaining a distance between the transducer and the touch position based on time from a point in time of transmitting the ultrasonic signal to a point in time of receiving the ultrasonic signal reflected by the touch position; and identifying the touch position based on the obtained distance.

14. The method according to claim 13, further comprising:

storing a profile of a waveform of the ultrasonic signal detected when the touch is not performed; and identifying that the touch is performed at a point in time where vibration of a signal occurs, when the vibration not shown in the profile appears in the waveform of the received ultrasonic signal.

15. The method according to claim 13, further comprising:

storing a table in which distances respectively corresponding to a plurality of times are tabulated; and obtaining a distance between the transducer and the touch position by referencing the table.

* * * * *